… … …

United States Patent Office 3,850,863
Patented Nov. 26, 1974

3,850,863
**BLENDS OF A BIODEGRADABLE THERMO-
PLASTIC OXYALKANOYL POLYMER AND A
NATURALLY OCCURRING BIODEGRADABLE
PRODUCT**
Robert A. Clendinning, New Providence, James E. Potts, Millington, and Walter D. Niegisch, Watchung, N.J., assignors to Union Carbide Corporation, New York, N.Y.
No Drawing. Filed July 28, 1972, Ser. No. 275,974
Int. Cl. C08g *51/14, 51/18*
U.S. Cl. 260—7.5              27 Claims

ABSTRACT OF THE DISCLOSURE

Blends comprising biodegradable thermoplastic oxyalkanoyl polymer, e.g., epsilon-caprolactone polymer, and naturally occurring biodegradable product, e.g., tree bark. These novel blends are useful in the production of shaped articles such as mulch film, transplanter containers, package containers, and the like.

---

This invention relates to novel blends comprising biodegradable thermoplastic oxyalkanoyl polymer such as epsilon-caprolactone homopolymer and naturally occurring biodegradable product such as tree bark, and to the novel shaped articles fabricated therefrom as exemplified by mulch films, transplanter containers, disposable containers, shipping crates and boxes, and the like.

Agricultural mulches are used to cover the soil about crops or other plantings in order to prevent or retard weed growth and to increase soil water retention and temperature. For many years, various naturally occurring materials have been used for this purpose such as peat moss, wood chips, chopped bark, sawdust, etc. However, repeated rainfalls tend to wash away such natural mulches leaving void and barren areas in the field. More recently, polyethylene film, both in its transparent state and its opaque state, has been found to be a useful mulch. When its presence on the ground is no longer desired, the film is physically removed from the fields. The necessity of such removal increases costs and complicates post harvest field preparation. Currently, the film is collected and burned. Obviously, it would be more desirable if the use of synthetic mulches more closely conformed to the practice with natural mulches. These natural mulches are not removed from the ground, but rather are turned back into the soil upon plowing at the start of the next growing season. Such factors undoubtedly led to the recent development of photodegradable or light degradable polyethylene film mulches. Various additives and ultraviolet light absorbers are compounded into the polyethylene thereby rendering this polymer photodegradable. The cost disadvantages incurred by adding and compounding such ingredients in polyethylene are obvious.

In the seed and nursery industries, it is the practice of the horticulturist to plant seeds or seedlings in soil or conditioned material which is contained in relatively small containers, such as metal cans or clay pots, so that initial growth may be carefully controlled under greenhouse or other desirable conditions. During such growth, the root system of the plant develops and becomes established within the soil or other material in the container. The use of metal, clay or other similar types of containers is generally satisfactory during the initial growth period. A major drawback of such containers is that the plant must be entirely removed from the container when it is to be transplanted to the field or to a larger container. Since the root system has developed within the soil or material in which growth was started, the roots are firmly embedded and intertwined with such soil and removal from the container of the plant and the soil in which the roots are established disturbs the root system and results in damage thereto. It would be advantageous, therefore, if such containers were fabricated from materials comprising biodegradable substances in which the container possessed the capability of maintaining its shape during the initial growth period of a plant and, after transplanting the container and its contents to the field, it possessed the capability of biodegrading and disintegrating.

In the regeneration of forests it is the practice of the silviculturist to employ, for the most part, bare-root planting methods. Though it is estimated that well over one billion bare-root tree seedlings are planted annually in North America, the bare-root planting method is fraught with disadvantages. A formidable obstacle to the silviculturist is the rapidity of physical deterioration of the bare-root stock. Reforestation is also beset with labor problems, antiquated tools, and dated concepts of planting. The silviculturist has very recently turned to experimenting with container planting methods. In this regard, new shapes and types of containers and accessory equipment for growing and planting seedlings have been devised. One method involves the mechanical metering of containerized seedlings into the terrain. The equipment utilized is a "planting gun" in which the container, in the shape of a "bullet," is placed into the planting gun, passed through the gun muzzle, and then mechanically inserted into the ground. The bullet can be fabricated from material such as polystyrene and is quite rigid in construction. To permit root egress of the seedling from such bullet to the surrounding soil after planting, the walls of the bullet can be weakened by strategically located grooves, splits, and/or holes. Unfortunately, there are drawbacks to the transplanter container method briefly described above. The plastic container or bullet is not biodegradable, that is, it is not consumed or substantially consumed by the action of microorganisms such as fungi and bacteria. Not only does this non-biodegradability factor represent an ecological problem, but also interference of the root system by the container wall results in damage and stunted growth of the seedling.

The literal inundation of our lands in recent years with plastic and plastic-like packaging material and shipping containers in the form of discarded film, boxes, crates, wrappings, etc., has received wide attention during the last decade. One approach towards a partial solution to this litter and disposal problem has been the incorporation of various additives into plastics to make them photodegradable. This approach, though of limited applicability, has merit and will probably gain, in the coming years, support from citizen-minded and nature-loving groups. Other approaches and alternatives, obviously, are being investigated.

Accordingly, it is an object of this invention to provide novel biodegradable blends comprising biodegradable thermoplastic oxyalkanoyl polymer and naturally occurring biodegradable product. It is also an object of the invention to provide novel blends from materials comprising biodegradable substances, said blends having the capability of being fabricated into articles of commerce, e.g., boxes, crates, packing material, and the like. Another object of the invention is to provide novel shaped biodegradable articles in the form of film, disposable containers, transplanter containers, shipping containers, storage containers, packaging material, toys, and the like. A further object is to provide an improved transplanter container fabricated from materials comprising biodegradable substances, said container having the capability of maintaining its shape during the initial growth period of a plant whereby the entire container and its contents can be transplanted, by hand or mechanical means, to the field or to a larger container without disturbing or damaging the root system. A still further object is to provide a novel biodegradable transplanter container which has sufficient strength to contain the soil in which the seed or seedling is planted, which has the capability of disintegrating when planted in the field, and which upon disintegration possesses the quality of acting as a soil conditioner whereby plant growth is encouraged and improved. A particular object is to provide an improved transplanter container constructed of materials which have the property of holding its shape in a moist and/or humid environment. A yet further object of the invention is to provide a novel agricultural mulch from material comprising biodegradable thermoplastic oxyalkanoyl polymer. Another object of the invention is to provide improved methods utilizing biodegradable mulches and transplanter containers. At least one of the aforesaid objects and other objects will become apparent to those skilled in the art in the light of the specification.

A broad aspect of the invention is directed to novel blends or mixtures comprising biodegradable thermoplastic oxyalkanoyl polymer and naturally occurring biodegradable products. The naturally occurring biodegradable products which are suitable in the practice of the invention are derived from or are a part of plant or animal species, such products not being chemically modified by man. Cellulosic esters and cellulosic ethers are thus not included within this definition. Strictly speaking, biodegradable materials are those which, because of their chemical structure are susceptible to being assimilated by microorganisms such as molds, fungi, and bacteria, when buried in the ground or otherwise contacted with the organisms under conditions conducive to their growth. The term "biodegradable" is often used indiscriminately to refer to various types of environmental degradation, including photodegradation. Though a polymeric material may be degraded by sunlight and oxygen this does not necessarily mean that such material will also be assimilated by microorganisms. The term "biodegradable," as used herein, is reserved for that type of degradability which is brought about by living organisms, usually microorganisms.

The naturally occurring biodegradable products which are suitable in the practice of the invention include, by way of illustrations, sugar cane residue, sugar beet residue, peat moss, sawdust, hemp, sisal, lien, corn starch, cotton, rice hulls, wheat bran, soybean meal, potato starch, corn syrup, rice flour, gelatin, barley flour, rye flour, granulated sugar, wheat flour, wood chips, brewers yeast, vegetable gum, egg albumin, cardboard, disintegrated or shredded tree bark especially Douglas Fir bark and Pine bark, cotton seed hulls, manure, disintegrated paper stock, shredded wood, hulled and coarsely ground as well as finely ground grain, and the like.

The thermoplastic oxyalkanoyl polymers which are contemplated as biodegradable material in the fabrication of the container possess a reduced viscosity value of at least about 0.1 and upwards to about 12, and higher. In various desirable embodiments thermoplastic oxyalkanoyl polymers which have a wide span of usefulness are those which possess a reduced viscosity value in the range of from about 0.2 to about 8. In the fabrication of transplanter containers having high utility in, for example, silvicultural and agricultural applications, the preferred thermoplastic oxyalkanoyl polymers possess a reduced viscosity value in the range of from about 0.25 to about 3. These polymers are further characterized in that they contain at least about 10 weight percent, desirably greater than about 20 weight percent of the oxyalkanoyl unit,

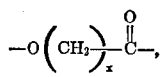

recurring therein, wherein $x$ is an integer having a value of 2,3, and 5–7, and preferably 5. In the practice of highly suitable embodiments of the invention, the thermoplastic oxyalkanoyl polymers contain at least about 50 weight percent, and preferably at least about 80 weight percent, and upwards to about 100 weight percent of the oxycaproyl unit, i.e.,

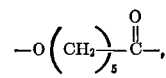

recurring therein.

The aforesaid recurring unit is interconnected through the oxy group (—O—) of one unit with a carbonyl group

of a second unit. In other words, the interconnection of such units does not involve the direct bonding of two carbonyl groups,

When the thermoplastic oxyalkanoyl polymer is a homopolymer or essentially a homopolymer, the polymer chain thereof consists essentially of interconnected recurring oxyalkanoyl units. In addition to the recurring oxyalkanoyl unit, the thermoplastic oxyalkanoyl polymer may comprise other moieties or groups therein especially those which intersperse or terminate the polymeric chain thereof as illustrated by the oxyalkylene group,

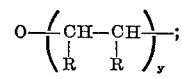

the

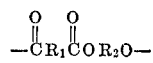

group; the

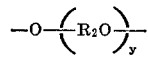

group; the

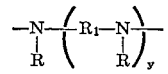

group; the

group; the urethane group,

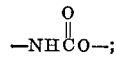

the

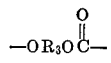

group; the

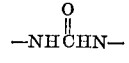

group; the biuret group,

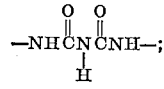

the

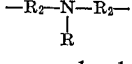

group; the divalent mono- and polyaromatic rings including fused and bridged rings; lower alkyl substituted oxyalkanoyl groups; catalyst residue; the carbonate group,

and others. With reference to the aforesaid groups or moieties, the variables R, $R_1$, $R_2$, $R_3$, and $y$ can be illustrated as follows: R represents hydrogen or lower alkyl; $R_1$ represents a divalent hydrocarbon group $R_2$; represents a divalent aliphatic hydrocarbon group or a divalent aliphatic oxa-hydrocarbon group; $R_3$ represents a divalent aliphatic hydrocarbon group; and $y$ represents an integer which has a value of at least one.

The term "lower alkyl," as used herein, represents a monovalent aliphatic hydrocarbon group having 1 to 4 carbon atoms, e.g., methyl, ethyl, propyl, isopropyl, n-butyl, etc. The term "divalent hydrocarbon group," as used herein, includes radicals such as $C_1$–$C_{12}$alkylene, $C_2$–$C_{12}$alkylidene, and $C_6$–$C_{12}$ arylene, e.g., methylene, propylene, butylene, hexamethylene, heptamethylene, cyclohexylene, phenylene, naphthylene, propylidene, butylidene, etc. The term "divalent aliphatic hydrocarbon group," as used herein, includes $C_2$–$C_{12}$alkylene and $C_2$–$C_{12}$alkylidene. The term "divalent aliphatic oxa-hydrocarbon group," as used herein, can be represented by the empirical formula, —$C_2$—$C_{12}$alkylene(oxy $C_2$–$C_{12}$alkylene)$_y$. The variable $x$, as used herein, represents an integer having a value of at least one.;

As previously noted, the thermoplastic oxyalkanoyl polymers which are suitable in the practice of the invention are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (benzene is preferred although cyclohexanone, chloroform, toluene or other common organic solvent for the polymer may be used) at 30° C.

The thermoplastic oxyalkanoyl polymers can be prepared by various methods. A general procedure involves reacting a large molar excess of the appropriate lactone, e.g., epsilon-caprolactone, zeta-enantholactone, and/or eta-caprylolactone with an organic initiator which contains two active hydrogen groups, e.g., hydroxyl, carboxyl, primary amino, secondary amino, and mixtures thereof, such groups being capable of opening the lactone ring whereby it adds as a linear chain (of recurring oxyalkanoyl units) to the site of the active hydrogen-containing group, at an elevated temperature, preferably in the presence of a catalyst, and for a period of time sufficient to produce the desired polymers. By carefully controlling the purity and molar ratio of lactone reactant to organic initiator, there can be produced "initiated" poly(oxyalkanoyl) polymers whose number average molecular weight can range from several hundred to above 100,000. Organic initiators which can be employed include primary diamines, secondary diamines, mixed primary-secondary diamines, aminoalcohols, diols, dicarboxylic acid, hydroxycarboxylic acids, aminocarboxylic acids, etc. Such organic initiators are voluminously illustrated in the literature, e.g., U.S. Pat. Nos. 3,169,945 and 3,427,346. Catalysts which can be employed include, for instance, stannous octanoate, tetrabutyltitanate, dibutyltin dilaurate, and the like. A temperature in the range of from about 150° C. to about 2500 C. for periods ranging upwards to about 24 hours, and longer, are suitable.

Thermoplastic oxycaproyl polymers can also be prepared by reacting the cyclic ester, e.g., epsilon-caprolactone, and/or the corresponding hydroxy-acid, e.g., 6-hydroxyaproic acid, and/or their oligomers, with a mixture comprising diol and dicarboxylic acid, using a molar excess of diol with relation to the dicarboxylic acid, or alternatively, using a molar excess of dicarboxylic acid with relation to the diol. It is highly desirable that free diol or free dicarboxylic acid not be present at the termination of the polyesterification reaction. The water of esterification which results during the reaction can be removed via conventional techniques. The diols and dicarboxylic acids which are particularly suitable include those illustrated by the formulae

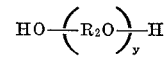

and $HOOCR_1COOH$ such as ethylene glycol, propylene glycol, diethylene glycol, dipropylene glycol, 1,4-butanediol, 1,5-pentanediol, 1,6-hexanediol, 1,10-decanediol, 1,4-cyclohexanediol, succinic acid, glutaric acid, adipic acid, pimelic acid, suberic acid, azelaic acid, sebacic acid, phthalate acid, and the like.

In the absence of added organic initiator, the thermoplastic oxyalkanoyl polymers can be prepared by polymerizing a lactone reactant, e.g., beta-propiolactone, delta-valerolactone, epsilon-carprolactone, etc., in the presence of anionic catalysts such as di-n-butylzinc, tri-n-butylaluminum, diethylmagnesium, aluminum triisopropoxide n-butyllithium, dimethylcadmium, and the like. The reaction is desirably conducted at an elevated temperature, e.g., 100° C. to 250° C., for periods of time ranging from minutes to several hours, e.g., from about 10 minutes to about 24 hours. The reaction mixture can comprise, in addition to the lactone reactant, minor quantities of other polymerizable cyclic monomers such as tetramethylene carbonate, methyl-epsilon-caprolactone, keto-dioxane, etc. The number average molecular weight of the resulting polymeric products which are produced by this exemplified "non-initiated" method are, in general, quite high. For example, products which have number average molecular weights ranging from about 10,000 to several hundred thousands can be prepared. The patent literature, e.g., U.S. Pat. Nos. 3,021,309 to 3,021,317, discusses in detail the preparation of these polymers.

Thermoplastic oxyalkanoyl polymers can also be prepared by polymerizing an admixture of $C_7$–$C_9$ lactone, a vicinal epoxy compound, e.g., ethylene oxide, propylene oxide, butylene oxide, cyclohexene oxide, etc., and an interfacial agent such as a solid, relatively high molecular weight poly(vinyl stearate) or lauryl methacrylate/vinyl chloride copolymer (reduced viscosity in cyclohexanone of from about 0.3 to about 1.0), in the presence of an inert normally-liquid saturated aliphatic hydrocarbon vehicle such as heptane, using phosphorus pentafluoride as the catalyst therefor, and in the absence of an active hydrogen-containing organic initiator, at an elevated temperature, e.g., about 80° C., and for a period of time sufficient to produce such polymers.

Thermoplastic oxylkanoyl polymers can also be prepared by reacting a molar excess of a lactone with a polyoxyalkylene diol which has a molecular weight ranging from about 400 to about 20,000 under conditions discussed *supra* with reference to the "initiated" poly(oxyalkanoyl) polymers. Illustrative of the polyoxyalkylene diols which are contemplated include the poly(oxyethylene) diols, the poly(oxypropylene) diols, and the poly(oxyethyleneoxypropylene) diols. The resulting polymers can be considered, in effect, to be ABA block polymers in which the A portions represent a polyoxyalkanoyl segment or block and in which the B portion represents a polyoxyalkylene segment or block. The number average molecular weight of these ABA block polymers can range upwards to 50,000 and higher, depending on the molecular weight of the polyoxyalkylene diol reactant and the molar ratio of the lactone reactant to polyoxyalkylene diol reactant employed and consumed in the process. By using mono end-blocked polyalkylene diols such as the monoalkyl ether of polyoxyalkylene diol, the above discussed preparation results in polymers having an AB block configuration.

Oxyalkanoyl polymers which can be considered to be "graft" polymers can be prepared by the addiiton of $C_6$–$C_9$ lactone at the active hydrogen sites, e.g., hydroxyl or amino, which are pendant along the polymeric chain of so-called vinyl polymers. Such vinyl polymers may, for example, be obtained by the copolymerization of ethylene and vinyl acetate, followed by subsequent saponification of the acetate groups to yield polymers which are characterized by a plurality of pendant hydroxyl groups along the polymeric chain thereof. A wide hose of ethylenically unsaturated monomers can be employed to prepare the vinyl polymers and include, for example, 2-hydroxyethyl acrylate, 2-hydroxy methacrylate, styrene, acrylonitrile, propylene, vinyl chloride, and the like. The choice of the ethylenically unsaturated monomers are such that the resulting polymer contains a plurality of pendant hydroxyl groups, or groups which can be converted to hydroxyl groups. The addition of the $C_6$–$C_9$ lactone at the active hydrogen site will produce "graft" polymers of number average molecular weights upwards to approximately 100,000 and higher.

The oxyalkanoyl polymers which have number average molecular weights of, for example, less than 25,000 are characterized by functional end groups. For instance, hydroxyl-terminated polymers can be prepared from a diol initiator and epsilon-caprolactone using molar ratios of lactone to initiator upwards to about 100:1. If desired, these hydroxyl-terminated polymers may be reacted with a diisocyanate, e.g., 2,4- and/or 2,6-tolylene diisocyanate, bis(4-isocyanatophenyl)methane, bis(4-isocryanatocyclohexyl)methane, etc., to extend the polymeric chain, or such hydroxyl-terminated polymers as well as their polyurethane extension products can be reacted with so-called "chain stoppers" such as a monocarboxylic acid or anhydride. As indicated previously, the thermoplastic oxyalkanoyl polymers which are suitable in the practice of the invention have, as its lower limit, a reduced viscosity value of at least about 0.1.

Though biodegradability of the thermoplastic oxyalkanoyl polymer is oftentimes manifest when at least about 10 weight percent of its weight is attributable to oxyalkanoyl units, especially oxycaproyl units, it is desirable that the novel blends, and articles therefrom, comprise thermoplastic oxyalkanoyl polymer in which at least about 20 weight percent of the weight of such polymer is in the form of oxyalkanoyl units, especially oxycaproyl units. In specific aspects of the invention it is preferred that such polymer contain at least about 50 weight percent, and preferably still at least about 80 weight percent, and upwards to about 100 weight percent of oxycaproyl units therein.

The proportions of the thermoplastic oxyalkanoyl polymer and the naturally occurring biodegradable product in the novel blends can vary over a wide range. The optimum composition of the blend will depend, to a significant extent, upon a consideration of factors such as the end-use contemplated; the characteristics or properties desired in the article of manufacture made from the blend, e.g., mechanical strength properties, rate and degree of biodegradability, etc.; the thermoplastic oxyalkanoyl polymer of choice; the naturally occurring biodegradable product of choice; the concentrations of the thermoplastic oxyalkanoyl polymer and the naturally occurring biodegradable product; the presence and kind of other ingredients, e.g., plastic additives, filler, plasticizers, dyes, etc.; and the like.

Broadly, the novel blends of the invention comprise from about 3 to about 97 weight percent of thermoplastic oxyalkanoyl polymer and from about 97 to about 3 weight percent of naturally occurring biodegradable product, based on the total weight of the blend. In various desirable embodiments which take into consideration various factors as illustrated above, the novel blends comprise from 10 to 90 weight percent, preferably from about 20 to about 80 weight percent, of thermoplastic oxyalkanoyl polymer; and from about 10 to about 90 weight percent, preferably from about 20 to about 80 weight percent, of naturally occurring biodegradable product; based on the total weight of the blend.

If desired, additional materials can be incorporated into the novel blend such as fibrous and non-fibrous fillers, plastic additives, plasticizers, dyes, etc. illustrative of the foregoing materials include kaolin, bentonite, polyethylene, the butadiene/styrene rubber gum stocks, the nitrile rubber gum stocks, the aminoplasts, the polyurethanes, the wax-like and solid water-soluble ethylene oxide homopolymers and copolymers, iron oxide, clay, polystyrene, coal dust, urea, talc, glass wool, carbon black, lamp black, silica, titanium dioxide, asbestos, vermiculite, metallic powders, mica, calcium sulfate, the polylactams, the polyureas, the dialkyl esters of phthalic acid, and the like. The aforesaid illustrated materials which may be incorporated into the novel blends can vary over a rather wide range, for example, from 0 to about 75 weight percent, preferably from 0 to about 60 weight percent, based on the total weight of said blend.

Suitable equipment for fluxing the novel blend comprising thermoplastic oxyalkanoyl polymer and naturally occurring biodegradable product include Banbury mixers, screw extruders, two-roll or multi-roll mills, ribbon or paddle blenders, calendars, and the like. The time of blending or fluxing is not narrowly critical. The blending time should be sufficient to obtain a substantially uniform mixture.

In various aspects of the invention the novel blends are useful in the preparation of novel biodegradable articles of manufacture such as mulch film, disposable containers, shipping containers, storage containers, packaging material, transplanter containers, and the like. Well-known techniques in the art can be used to fabricate these novel articles and they include, for instance, compression molding, injection molding, transfer molding, extrusion, vacuum forming, blow molding, calendering, rotational molding, and the like.

Novel articles of manufacture which have "tailor-made" or "built-in" properties or characteristics can be fabricated from the novel blends. A reason for this is that thermoplastic oxyalkanoyl polymer as exemplified by high molecular weight epsilon-caprolactone homopolymer, unlike other plastics such as the polyethylenes and the polystyrenes, has the capability of readily accepting high loadings of the naturally occurring biodegradable product while maintaining or evidencing an increase in the stiffness or modulus of shaped articles fabricated from such "filled" polymers. Quite obviously, too, the cost of such articles are reduced by increased use of the relatively inexpensive naturally occurring biodegradable product.

Depending upon the intended end-use, novel blends can be formulated to further incorporate additional features and advantages thereto. By way of illustrations, novel articles of manufacture having utility in horticultural, silvicultural, and agricultural applications, e.g., mulch film and transplanter containers, can be fabricated from novel blends comprising biodegradable thermoplastic oxyalkanoyl polymer, naturally occurring biodegradable product, and water-soluble polymers, e.g., wax-like and solid water-soluble ethylene oxide homopolymers and copolymers. Such novel articles have the ability to undergo relatively slow dissolution or leaching in an aqueous or humid surrounding to thus provide a more favorable environment for growth of fungi. Additional ingredients which can be included in the novel blends of the invention include plant nutrients, fertilizer, insecticides, pesticides, herbicides, and the like.

In the practice of various embodiments of the invention it is desirable that the novel articles of manufacture possess properties and characteristics which are suitable for the application contemplated. For instance, if the novel articles are to be used in mechanical transplantation methods or as shipping containers, e.g., boxes, crates, etc., it is highly desirable that such articles have sufficient strength properties to withstand breakdown or failure during use. By way of illustration, one can use, if desired, containers which are characterized by a modulus range of from about 10,000 p.s.i., and lower, to about 1,000,000 p.s.i. (as determined by ASTM Method D-638). On the other hand, containers characterized by a much lower modulus can be tolerated in hand planting techniques, e.g., at least about 300 p.s.i. It is to be understood that the aforementioned values are merely illustrative and that higher and lower values are contemplated as being within the scope of the invention.

By the terms "biodegradable" and "biodegradability," as used herein, are meant that the novel blends and articles therefrom are capable of being consumed by microorganisms as, for example, bacteria or fungi, in an environment suitable to the growth of microorganisms such that there results a weight loss of at least approximately 20 weight percent in the biodegradable thermoplastic oxyalkanoyl polymer component within a period of about four years, and generally within about two years. The degree and rate of biodegradability depend, to an extent, on the weight percent oxyalkanoyl content, especially oxycaproyl content, in the thermoplastic oxyalkanoyl polymer used in the blend or article, and the presence or absence of biodegradable additives, fillers, plasticizers, etc. By way of illustration, containers fabricated from thermoplastic epsilon-caprolactone homopolymer ($I_r$ of about 0.7) and Douglas Fir bark and subjected to soil burial tests, evidence weight losses up to and exceeding 40 weight percent within one year due to container disintegration and container consumption by microorganisms.

In the illustrative Examples hereinafter disclosed, numerical references in the copolymer or blends designate parts by weight. For example, 67 ethylene/33 vinyl acetate refers to a copolymer containing 67 parts by weight of vinyl acetate chemically combined therein.

Examples 1-24

In Examples 1-24 *infra*, samples of commercially available high molecular weight polymers were pressed or molded into plaques from which test specimens were cut. These specimens were tested for degradation by fungi using ASTM–D–1924–63 [1]. This procedure requires the placement of test specimens in or on a solid agar growth medium that is deficient only in carbon. The medium and specimens were inoculated with the test microorganisms and incubated for three weeks. Any growth which may occur is dependent on the utilization of a component of the specimen as a carbon source by the test organism. The test fungi consisted of a mixture of *Aspergillus niger*, *Aspergillus flavus*, *Chaetomium globosum*, and *Penicillium funiculosum*. Since possible complication that growth may occur as a result of the presence of additives in the polymeric specimen, it was necessary that the polymeric specimen tested be free from stabilizers, plasticizers, lubricants, and other extraneous organic substances, or that the presence of such additives be recognized. If a pure polymeric specimen showed heavy growth and concurrent loss of weight and mechanical properties this was considered good evidence of its biodegradability.

After various exposure times up to three weeks, and longer, the samples were examined and assigned growth ratings as shown below:

Growth Ratings:
    0=No growth
    1=Traces (less than 10% covered)
    2=Light growth (10 to 30% covered)
    3=Medium growth (30 to 60% covered)
    4=Heavy growth (60 to 100% covered)

[1] ASTM–D–1924: Recommended practice for determining resistance of synthetic polymeric materials to fungi. Ann. Book of ASTM Standards, 1970, Part 24, page 593.

The pertinent data are set out in Table I below.

TABLE I

| Sample No. | Commercial thermoplastic | Growth rating |
|---|---|---|
| 1 | Acrylonitrile/butadiene/styrene Terpolymer (ABS).[a] | 0 |
| 2 | Blend of ABS and poly(bisphenol A carbonate).[b] | 0 |
| 3 | Butadiene/acrylonitrile rubber [c] | 0 |
| 4 | 72/Styrene/28 acrylonitrile copolymer | 0 |
| 5 | Poly(methyl methacrylate)[d] | 0 |
| 6 | Poly(ethylene terephthalate)[e] | 0 |
| 7 | Poly(cyclohexanedimethanol terephthalate)[f] | 0 |
| 8 | Poly(bisphenol A carbonate)[g] | 0 |
| 9 | Poly(4 methyl 1 pentene) | 0 |
| 10 | Polyisobutylene [h] | 0 |
| 11 | Chlorosulfonated polyethylene [i] | 0 |
| 12 | Cellulose acetate [j] | 0 |
| 13 | Cellulose butyrate [k] | 0 |
| 14 | Nylon 6; Nylon 6/6; Nylon 12 | 0 |
| 15 | Poly(vinyl butyral) | 0 |
| 16 | Polyformaldehyde [l] | 0 |
| 17 | Poly(vinyl ethyl ether); $I_r$=4 | 0 |
| 18 | Poly(vinyl acetate); $I_r$=0.8 | 1 |
| 19 | Poly(vinylacetate), 50% hydrolyzed to poly(vinyl alcohol). | 1 |
| 20 | High density polyethylene, 31,600 M.W. | 0 |
| 21 | High density polyethylene, 52,500 M.W. | 0 |
| 22 | High density polyethylene, 97,300 M.W. | 1 |
| 23 | Low density polyethylene, 21,000 M.W. | 1 |
| 24 | Low density polyethylene, 28,000 M.W. | 0 |

[a] Kralastic® K2938 by Uniroyal, Inc.
[b] Cycoloy® by Borg Warner Corp.
[c] Hycar® 1002 by B. F. Goodrich Co.
[d] Lucite® by E. I. duPont de Nemours & Co.
[e] Arnite® by Polychem AKU-GE, Holland.
[f] Kodel® by Eastman Kodak Co.
[g] Lexan® 101 by General Electric Co.
[h] Vistanex® by I. G. Farben.
[i] Hypalon® (29% Cl) by E. I. duPont de Nemours & Co.
[j] Tenite® (036A3719748) by Eastman Kodak Co.
[k] Tenite® (233A22300II2) by Eastman Kodak Co.
[l] Celcon® by Celanese Corp.

Examples 25-30

Various polymers were tested for biodegradability in the manner indicated in Examples 1-24 *supra*. The results are documented in Table II below.

TABLE II

| Sample No. | Polymer | Reduced viscosity | Growth rating |
|---|---|---|---|
| 25 | Epsilon-caprolactone homopolymer | 0.7 | 4 |
| 26 | do | 0.3 | 4 |
| 27 | Pivalolactone homopolymer | 0.1 | 0 |
| 28 | Poly(ethylene terephthalate) | High | 0 |
| 29 | Poly(cyclohexanedimethanol terephthalate). | do | 0 |
| 30 | Thermoplastic polyoxy-caproyl polyurethane.[a] | do | 4 |

[a] Reaction of diethylene glycol initiated poly-(epsilon-caprolactone) diol of 2000 molecular weight with bis(4-isocyanatophenyl)methane using an NCO/OH ratio equal to one.

Examples 31-34

Four normally-solid thermoplastic oxycaproyl graft polymers prepared by reacting epsilon-caprolactone with styrene/2-hydroxyethyl methacrylate copolymer were tested for biodegradability in the manner set out in Examples 1-24 *supra*. The results are recorded in Table III below.

TABLE III

| Example No. | Graft polymer [a] | Reduced viscosity | Growth rating |
|---|---|---|---|
| 31 | 2.25 S/0.5 HM/77 CL | 0.7 | 4 |
| 32 | 67 S/1.0 HM/32 CL | 0.9 | 4 |
| 33 | 78 S/1.0 HM/21 CL | 0.8 | 2 |
| 34 | 89 S/3.0 HM/8 CL | 0.6 | 1 |

[a] The notation S/HM/CL for the graft polymer represents styrene/2-hydroxyethyl methacrylate/epsilon-caprolactone.

Examples 35-36

Two normally-solid thermoplastic oxycaproyl graft polymers prepared by reacting epsilon-caprolactone with hydrolyzed ethylene/vinyl acetate copolymer were tested for biodegradability in the manner set out in Examples 1–24 *supra*. The results are noted in Table IV below.

TABLE IV

| Example No. | Graft polymer | Growth rating |
|---|---|---|
| 35 | 18 ethylene/6 vinyl alcohol/76 CL.[1] | 4 |
| 36 | 36 ethylene/12 vinyl alcohol/52 CL.[1] | 4 |

[1] "CL" represents epsilon-caprolactone.

Examples 37–46

Several relatively low molecular weight thermoplastic copolymers of ethylene and different vegetable oils were tested for biodegradability in the manner set out in Examples 1–24 *supra*. These copolymers were carefully purified before testing to remove unreacted vegetable oil. The pertinent data are noted in Table V below.

TABLE V

| Sample No. | Ethylene/vegetable oil copolymer | Growth rating |
|---|---|---|
| 37 | 74 ethylene/26 castor oil | 0 |
| 38 | 72 ethylene/28 linseed oil | 0 |
| 39 | 73 ethylene/27 safflower oil | 0 |
| 40 | 73 ethylene/27 soybean oil | 0 |
| 41 | 59 ethylene/41 neat foot oil | 0 |
| 42 | 80 ethylene/20 peanut oil | 0 |
| 43 | 81 ethylene/19 rapeseed oil | 0 |
| 44 | 84 ethylene/16 olive oil | 0 |
| 45 | 82 ethylene/18 corn oil | 0 |
| 46 | 91 ethylene/9 oleic acid | 0 |

Examples 47–64

In Examples 47–64 various blends of epsilon-caprolactone homopolymer designated as PCL for convenience, reduced viscosity ($I_r$) of 0.7, and other substances were formed by fluxing on a two-roll mill for periods of time ranging from 5 to 20 minutes at temperatures upwards of about 75° C. depending on the softening point of the components comprising the blend. Plaques measuring about 6" x 6" x 0.04" from the blend were then formed via compression molding techniques. Strips measuring approximately 1" x 2" x 0.04" were cut from the plaques. Various strips were buried in a mixture of equal parts of New Jersey garden soil, Michigan peat moss, and builders sand. After two months the strips were removed and measured for weight loss. Various strips were also tested for degradation by fungi using ASTM Method D–1924–63. The pertinent data are noted in Table VI below.

Example 65

The blends set out in Examples 47–68 are molded or extruded into containers designed in the shape of a "bullet" measuring approximately 5 inches in length and one inch in outside diameter (maximum for bullet). The wall of the bullet is about 1/16 inch in thickness and is weakened by a slit 1/16 inch wide that extends longitudinally from the rim to a hole near the point of the bullet. The hole is about 1/4 inch wide and about 1/2 inch long. The containers are filled with a mixture containing equal parts of garden soil, Michigan peat moss, and builders sand, and seeded with Douglas Fir. Within the confines of a greenhouse, the containers are then inserted into garden soil enriched with plant nutrients and conditioners. The watering schedule is predetermined and takes into consideration the container size, climate, and tree species. After periods of six months and 12 months, normal root structure and normal growth of the tree seedlings are observed. Visual examination of the containers shows substantial disintegration.

Examples 66–67

Poly(beta-propiolactone) and poly(delta-valerolactone) were tested for biodegradability in the manner indicated in Examples 1–24 *supra*. The results are noted in Table VII below.

TABLE VII

| Sample No. | Polymer | Reduced viscosity | Growth rating [a] |
|---|---|---|---|
| 66 | Beta-propiolactone homopolymer | [b] 1.36 | 4 |
| 67 | Delta-valerolactone homopolymer | 0.48 | 4 |

[a] Determined in accordance with ASTM method D–1924–63.
[b] Determined 0.2 gram/100 cc. chloroform.

Examples 68–69

Thermoplastic beta-propiolactone homopolymer ($I_r$ of 1.36; 0.2 gm./100 cc. of chloroform) and delta-valerolactone homopolymer ($I_r$ of 0.48) are tested for biodegradability (ASTM Method D–1924–63). The physical properties of the tested samples are measured by a modified ASTM D882–67 (Method A) procedure using an Instron Tensile Tester. In this modification a one inch specimen is used and stretched at a rate of 0.2 inch per minute to a one per cent stretch to obtain the modulus; the same specimen is then stretched at a rate of 2 inches per minute to obtain the stress-strain curve. The pertinent data are shown in Table VIII below.

TABLE VI

| Example No. | Composition of blend | Growth rating [a] | Modulus [b] ×10³ p.s.i. | Izod [c] impact | Weight loss 2 months | Weight loss 4 months |
|---|---|---|---|---|---|---|
| 47 | 80 PCL [d]/20 shredded paper | 4 | 115 | 0.64 | 6.3 | 20 |
| 48 | 60 PCL/20 hydroxypropylcellulose/20 PCP 2000 [e]. | 4 | 46 | ([l]) | 12.9 | 27 |
| 49 | 80 PCL/20 rice hulls | 4 | 71 | 0.62 | 23.1 | 40 |
| 50 | 80 PCL/20 corn starch | 4 | 91 | 0.42 | 6.2 | 27 |
| 51 | 80 PCL/20 corn syrup | 4 | 78 | 0.63 | 15.5 | 35 |
| 52 | 60 PCL/40 urea | 4 | 97 | 0.3 | 41.2 | 46 |
| 53 | 80 PCL/20 peat moss | 4 | 98 | ([l]) | 2.1 | 7 |
| 54 | 80 PCL/20 soya bean powder | 4 | 76 | 0.52 | 19.6 | ([k]) |
| 55 | 80 PCL/20 brewer yeast | 4 | 106 | 0.58 | 40.4 | ([k]) |
| 56 | 60 PCL/40 hydroxypropylcellulose | 4 | 37 | 0.63 | 36.7 | 39 |
| 57 | 60 PCL/40 woodflower | 4 | 205 | 0.44 | 4.1 | ([l]) |
| 58 | 60 PCL/40 douglas fir bark [f] | 4 | 201 | 0.69 | 6.3 | ([l]) |
| 59 | 80 PCL/20 granulated sugar | 4 | 80 | ([l]) | 17.3 | 28 |
| 60 | 80 PCL/20 egg albumin | 4 | 86 | ([l]) | 11.4 | [j] 27 |
| 61 | 80 PCL/20 urea | 4 | 76 | 0.52 | 34.9 | 36 |
| 62 | 50 PCL/25 douglas fir bark/25 EEA [g] | 4 | 60 | 0.72 | 6.2 | ([l]) |
| 63 | 25 PCL/50 douglas fir bark/25 LDPE.[h] | 4 | 73 | 0.54 | 2.7 | ([l]) |
| 64 | 25 PCL/25 douglas fir bark/50 EVA [i] | 4 | 69 | 0.58 | 3.2 | ([l]) |

[a] Determined in accordance with ASTM method D–1924–63.
[b] Determined in accordance with ASTM Method D–638.
[c] Determined in accordance with ASTM Method D–256.
[d] PCL represents epsilon-caprolactone homopolymer having a reduced viscosity value of 0.7.
[e] Diethylene glycol initiated poly(epsilon-caprolactone) diol having a number average molecular weight of about 2000.
[f] Silvacon 412 manufactured by Weyerhaeuser Co.
[g] 82 ethylene/18 ethyl acrylate copolymer having a melt index of 6. All melt indices herein were determined in accordance with ASTM method D–1238 (condition E).
[h] LDPE represents low density polyethylene.
[i] 82 ethylene/18 vinyl acetate copolymer having a melt index of 130.
[j] Weight loss at 3 months.
[k] Complete disintegration.
[l] Not measured.

TABLE VII

| Sample No. | Polymer | Growth rating | Modulus, p.s.i. | Tensile strength, p.s.i. | Elongation at break, percent |
|---|---|---|---|---|---|
| 68 | Delta-valerolactone homopolymer | 4 | 67,000 | 1,400 | 3.0 |
| 69 | Beta-propiolactone homopolymer | 4 | 161,000 | 1,000 | 0.6 |

We claim:

1. A blend comprising (i) from about 3 to about 97 weight percent of biodegradable thermoplastic oxyalkanoyl polymer, said polymer having a reduced viscosity value of at least about 0.1 and upwards to about 12 and being further characterized in that at least about 10 weight percent of said thermoplastic oxyalkanoyl polymer is attributable to recurring oxyalkanoyl units of the formula

wherein $x$ is an integer having a value of 2 to 7, with the proviso that $x$ does not equal 3; and (ii) from about 97 to about 3 weight percent of naturally occurring biodegradable product, based on the total weight of said blend.

2. The blend of claim 1 wherein said recurring oxyalkanoyl units have the formula

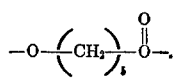

3. The blend of claim 2 wherein said biodegradable thermoplastic oxyalkanoyl polymer has a reduced viscosity value of at least about 0.2 to about 8 and is further characterized in that at least about 20 weight percent of said polymer is attributable to the recurring oxyalkanoyl unit shown therein.

4. The blend of claim 3 wherein at least about 50 weight percent of said polymer is attributable to recurring oxycaproyl units.

5. The blend of claim 4 wherein at least about 80 to about 100 weight percent of said polymer is attributable to recurring oxycaproyl units.

6. The blend of claim 4 wherein said polymer has a reduced viscosity value of at least about 0.25 to about 3.

7. The blend of claim 4 comprising (i) from about 10 to about 90 weight percent of biodegradable thermoplastic oxycaproyl polymer, and (ii) from about 10 to about 90 weight percent of naturally occurring biodegradable product, based on the total weight of said blend.

8. The blend of claim 1 wherein said naturally occurring biodegradable product is tree bark.

9. The blend of claim 8 wherein said naturally occurring biodegradable product is shredded wood.

10. The blend of claim 8 wherein said tree bark is Douglas Fir bark.

11. Articles of manufacture from the blend claimed in claim 1.

12. Articles of manufacture from the blend claimed in claim 2.

13. Articles of manufacture from the blend claimed in claim 3.

14. Articles of manufacture from the blend claimed in claim 4.

15. Articles of manufacture from the blend claimed in claim 5.

16. The articles of manufacture of claim 15 in the form of a container.

17. The articles of manufacture of claim 15 in the form of a film.

18. The articles of manufacture of claim 15 in the form of packaging material.

19. A blend comprising (i) from about 3 to about 97 weight percent of biodegradable thermoplastic oxyalkanoyl polymer, said polymer having a reduced viscosity value of at least about 0.1 and upwards to about 12 and being further characterized in that at least about 10 weight percent of said thermoplastic oxyalkanoyl polymer is attributable to recurring oxyalkanoyl units of the formula

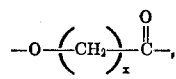

wherein $x$ is an integer having a value of 2 to 7, with the proviso that $x$ does not equal 3; and (ii) from about 97 to about 3 weight percent of soybean powder, based on the total weight of said blend.

20. The blend of claim 19 wherein said recurring oxyalkanoyl units have the formula

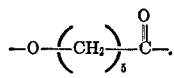

21. The blend of claim 20 wherein said biodegradable thermoplastic oxyalkanoyl polymer has a reduced viscosity value of at least about 0.2 to about 8 and is further characterized in that at least about 20 weight percent of said polymer is attributable to the recurring oxyalkanoyl unit shown therein.

22. The blend of claim 21 wherein at least about 50 weight percent of said polymer is attributable to recurring oxycaproyl units.

23. The blend of claim 22 wherein at least about 80 to about 100 weight percent of said polymer is attributable to recurring oxycaproyl units.

24. The blend of claim 22 wherein said polymer has a reduced viscosity value of at least about 0.25 to about 3.

25. The blend of claim 22 comprising (i) from about 10 to about 90 weight percent of biodegradable thermoplastic oxycaproyl polymer, and (ii) from about 10 to about 90 weight percent of soybean powder, based on the total weight of said blend.

26. Articles of manufacture from the blend claimed in claim 23.

27. The articles of manufacture of claim 26 in the form of a container.

References Cited

UNITED STATES PATENTS

| | | | |
|---|---|---|---|
| 3,632,687 | 1/1972 | Walter et al. | 260—896 |
| 3,734,979 | 5/1973 | Koleske et al. | 260—897 |
| 3,169,945 | 2/1965 | Hostettler | 260—78.3 |
| 3,741,918 | 6/1973 | Koleske et al. | 260—2.5 |
| 3,636,956 | 1/1972 | Schneider | 260—78.3 |
| 3,647,111 | 3/1972 | Stager et al. | 220—83 |
| 3,746,670 | 7/1973 | McGuire | 260—7.5 |
| 3,314,205 | 4/1967 | Davis, Jr. | 260—9 |
| 3,361,690 | 1/1968 | Gregory et al. | 260—9 |
| 3,481,257 | 12/1969 | Shimp et al. | 260—9 |

OTHER REFERENCES

Polymer Preprints, Vol. 13, No. 2, pp. 629–634, Potts et al., received July 15, 1972.

Chem. Tech., July 1971, pp. 409–415.

Applied Micobiology, Vol. 16, No. 6, pp. 900–905, June 1968.

MELVYN I. MARQUIS, Primary Examiner

E. C. RZUCIDLO, Assistant Examiner

U.S. Cl. X.R.

220—1 R, Dig. 30; 260—9, 78.3 R, Dig. 43